United States Patent
Nakano et al.

(10) Patent No.: US 7,200,628 B2
(45) Date of Patent: Apr. 3, 2007

(54) METHOD FOR RESERVING PAGES OF DATABASE

(75) Inventors: Yukio Nakano, Oyama (JP); Yuki Sugimoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 402 days.

(21) Appl. No.: 10/353,209

(22) Filed: Jan. 27, 2003

(65) Prior Publication Data

US 2003/0217075 A1    Nov. 20, 2003

(30) Foreign Application Priority Data

May 16, 2002    (JP)    ............................. 2002-140893

(51) Int. Cl.
*G06F 17/30* (2006.01)
(52) U.S. Cl. .................... 707/206; 707/205; 707/101
(58) Field of Classification Search .................. 707/1, 707/2, 3, 4, 5, 6, 7, 8, 9, 10, 100, 101, 102, 707/104.1, 200, 205, 206; 711/170
See application file for complete search history.

(56) References Cited

U.S. PATENT DOCUMENTS 6,411,964 B1 *    6/2002    Iyer et al. .................. 707/200
6,668,263 B1 *   12/2003    Cranston et al. ............ 707/205
6,834,290 B1 *   12/2004    Pugh et al. .................. 707/205
6,865,657 B1 *    3/2005    Traversat et al. ........... 711/170

OTHER PUBLICATIONS

Jim Gray et al., "Transaction Processing: Concepts and Techniques", ISBN 1-55860-190-2 pp. 758-761, 1993.

* cited by examiner

*Primary Examiner*—Yicun Wu
(74) *Attorney, Agent, or Firm*—Hogan & Hartson LLP

(57) ABSTRACT

To store data in an insertion process, a process 1 that inserts data into a new block and a process 2 that inserts, within the block reserved, data into areas that became free when data was deleted are prepared. A switching event to switch from the process 1 to the process 2 is designated in advance. The occurrence of the designated event is checked while executing the process 1 in an insertion process, and if the designated event occurs, the insertion process executes the process 2. If during the execution of the process 2, areas that can be reused become depleted, the execution of the insertion process reverts back to the process 1. As a result, free areas resulting from deletions can be reused according to the switching event designated.

18 Claims, 16 Drawing Sheets

Fig. 1(a)
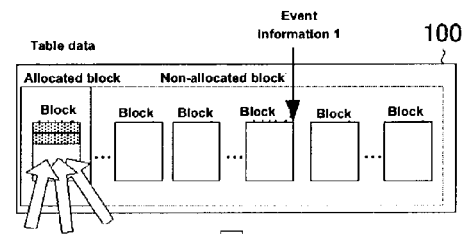
Fig. 1 (b)
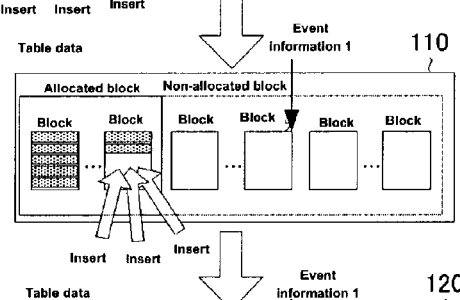
Fig. 1 (c)
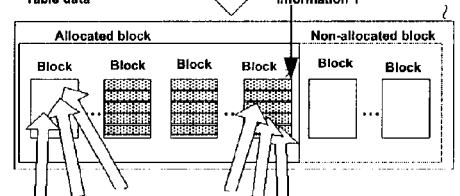
Fig. 1 (f)  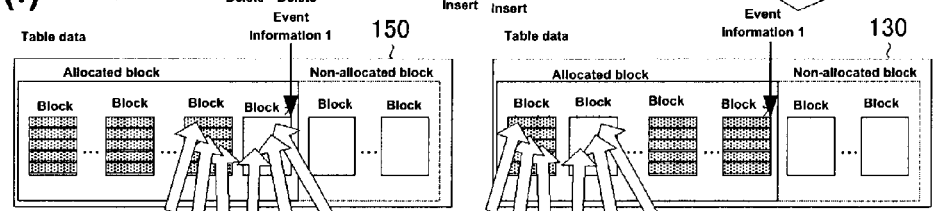  Fig. 1 (d)
 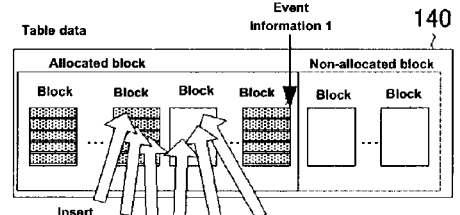 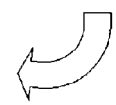
Fig. 1 (e)

Fig. 11(a)
Fig. 11 (b)
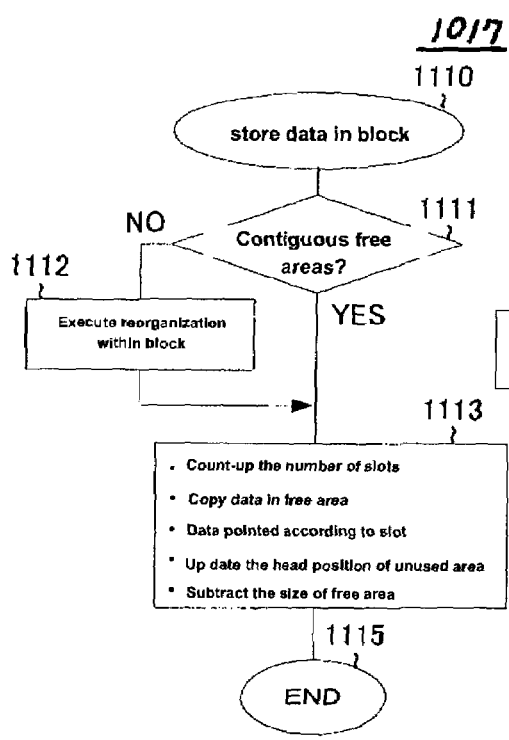
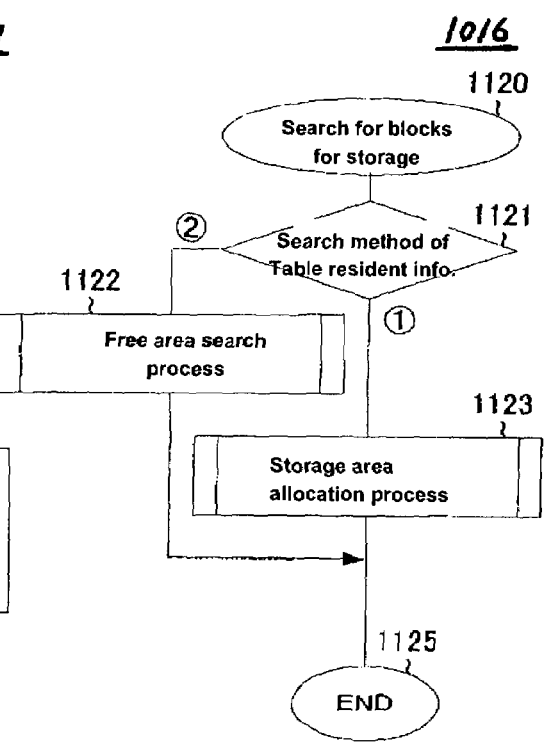

METHOD FOR RESERVING PAGES OF DATABASE

BACKGROUND OF THE INVENTION

1. Field of the Invention

The present invention relates to a method for processing relational database management systems (RDBMS), and especially to a method for reserving pages of databases when there is insufficient free area in the databases.

2. Related Background Art

In database management systems, when inserting data in a table, an area for storage is allocated in a memory and data is stored. A plurality of data is stored in the area allocated, and when there are no more free areas in the area allocated, a new area is allocated in the memory and data is stored there. When data is deleted, the corresponding data in the area allocated is deleted and the part deleted becomes a free area. Generally, inserting, updating and/or deleting data repeatedly lower storage efficiency, which leads to deteriorating access performance. Consequently, reorganization of memory areas must be executed at appropriate times to reclaim free areas and reload data. In conventional reorganization, access to tables while they are being reorganized is prohibited, and databases are suspended at night or on non-business days for reorganization.

One way to restrain the lowering of storage efficiency is to preferentially use areas that have become free through deletions.

Examples of this involve a management system based on free space management table and a management system using free space cursor, which are described in *Transaction Processing: Concepts and Techniques* (ISBN 1-55860-190-2), pp 758–760, Jim Gray, Andreas Reuter 1993, Morgan Kaufman Publishers, Inc.

In the management system based on free space management table, an entry that stores the size of a free space of each storage area is created; and when securing a free space, an area that can be used for storage is searched by referring to the size of a free space of each storage area in the entry.

In the management system using free space cursor, a chain of free spaces and a point to a page in which data is currently inserted are retained; as long as data can be stored in the page currently being used, the data is stored in the page; and when the page is full, a free page is extracted from the chain of pages to use it as a current page in which data is to be inserted. When a page becomes free as a result of deletion, such page is added to the head of the chain of free pages.

However, in the method that stores the size of free space, the size of free space in each storage area must be checked in order to find an area that can be used for storage at each insertion processing. Also, the method that uses free space cursor requires an extra process (for example, a process to add an area that has become free by deletion) to be executed to perform storage management at each delete processing, which gives an extra burden to the delete processing.

Compared to these two systems, a system that allocates a new area on a storage device can perform an insertion processing at the highest speed, and does not give an extra burden to the delete processing.

There is an online reorganization function, in which reorganization takes place without having to prohibit access to tables. In this processing method, data in a first area to be reorganized is copied onto another area while the first area is reorganized, and the copy source and the copy destination are switched when copying is completed; however, a temporary area having a size equivalent to the area to be reorganized is required to make a copy.

With a rapid spread of the Web on a global scale, there are demands to provide database services 24 hours a day, 365 days a year. Consequently, there are increasing demands to reorganize without suspending service and to prevent the deterioration of storage efficiency and of access performance without reorganization.

In conventional technologies, the processing performance in insert and delete processes suffers to improve the storage efficiency, and the conventional technology also requires a temporary area to execute online reorganization.

SUMMARY OF THE INVENTION

The present invention provides a method to prevent the deterioration of storage efficiency and eliminate reorganization or delay the reorganization period, without using additional areas and without deteriorating processing performance in insert and delete processes.

An embodiment of the present invention relates to a database system that accepts and analyzes an inquiry request from the user and executes a required process and stores data in a memory device, wherein a switching event is designated to switch a data storage processing, upon executing data insertion when storing data, between a first process, in which data is stored in a new area that is allocated in a memory area of the memory device, and a second process, in which data is stored in a free area created by deleting data from a group of memory areas already allocated; when data begins to be inserted, the data is stored through the first process; and when the designated event occurs, the data is stored through the second process by switching the data storage processing to thereby reserve a corresponding page of the database.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIGS. 1(a)–1(f) show an example of an operation of repeatedly executing insertions and deletions when the amount of data stored remains unchanged.

FIGS. 11(a) and 11(b) show a flowchart of data storage to a block and a flow of search process for storage block.

DESCRIPTION OF THE PREFERRED EMBODIMENT

The preferred embodiment of the present invention is described below in detail.

FIG. 1 is an example to which the present invention is applied, where data is repeatedly inserted and deleted, so that the amount of data stored remains unchanged. The details of this execution example are described later.

Figure 2:
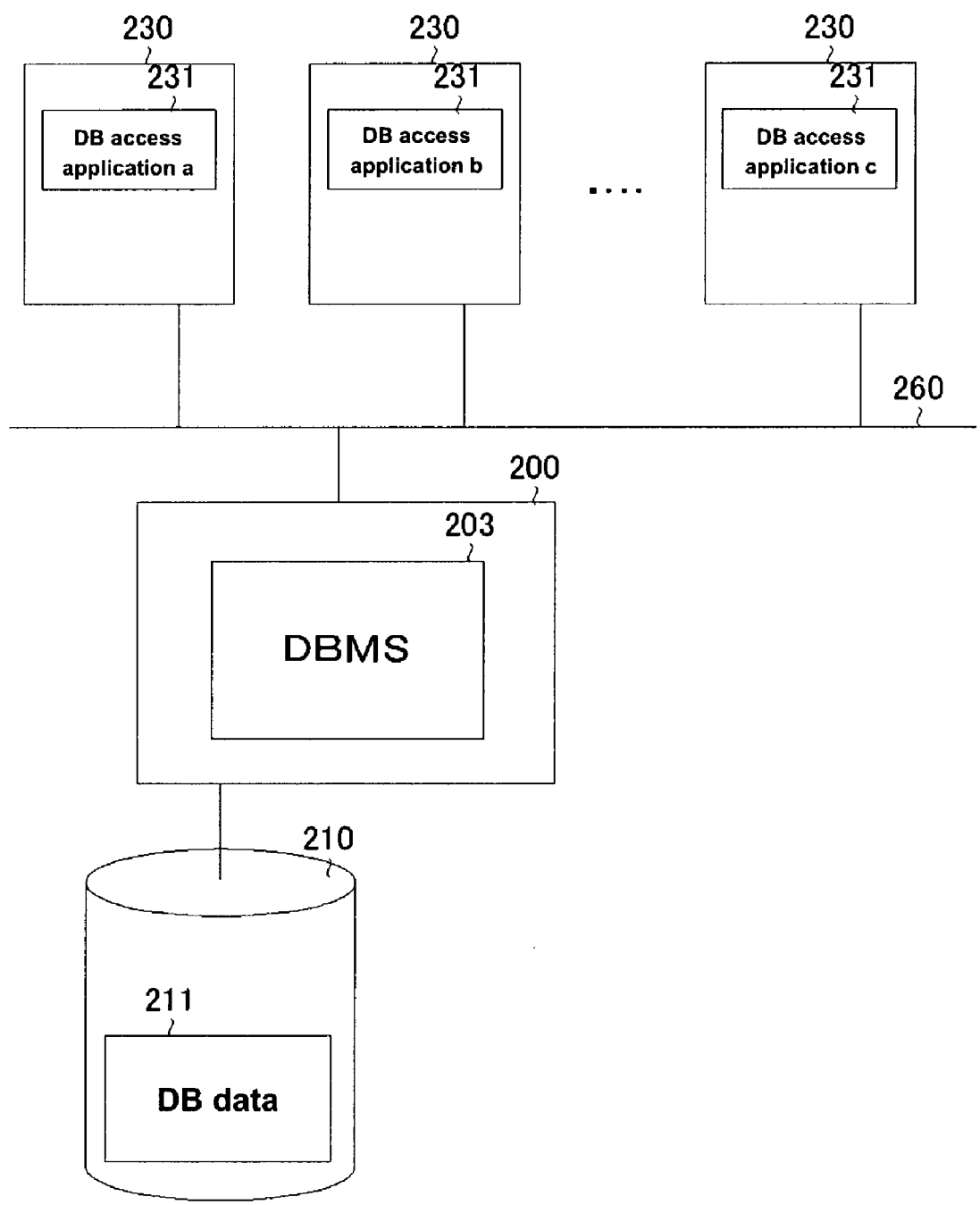
FIG. 2 shows an overall configuration of a system in accordance with an embodiment of the present invention.

FIG. 2 shows an overall configuration of an application of the present invention.

Each of data base (DB) access applications (a–c) 231 operates in each of information processors 230, while a (database management system) DBMS 203 operates in an information processor 200. The information processors 200 and 230 are connected to a network 260 and can communicate with each other.

Any of the DB access applications 231 can send an inquiry request to the DBMS 203 of the information processor 200 via the network 260. Upon accepting the inquiry request, the DBMS 203 executes a process that corresponds to the inquiry request by accessing DB data 211 stored in a disk device 210 that is connected to the information processor 200.

Figure 3:
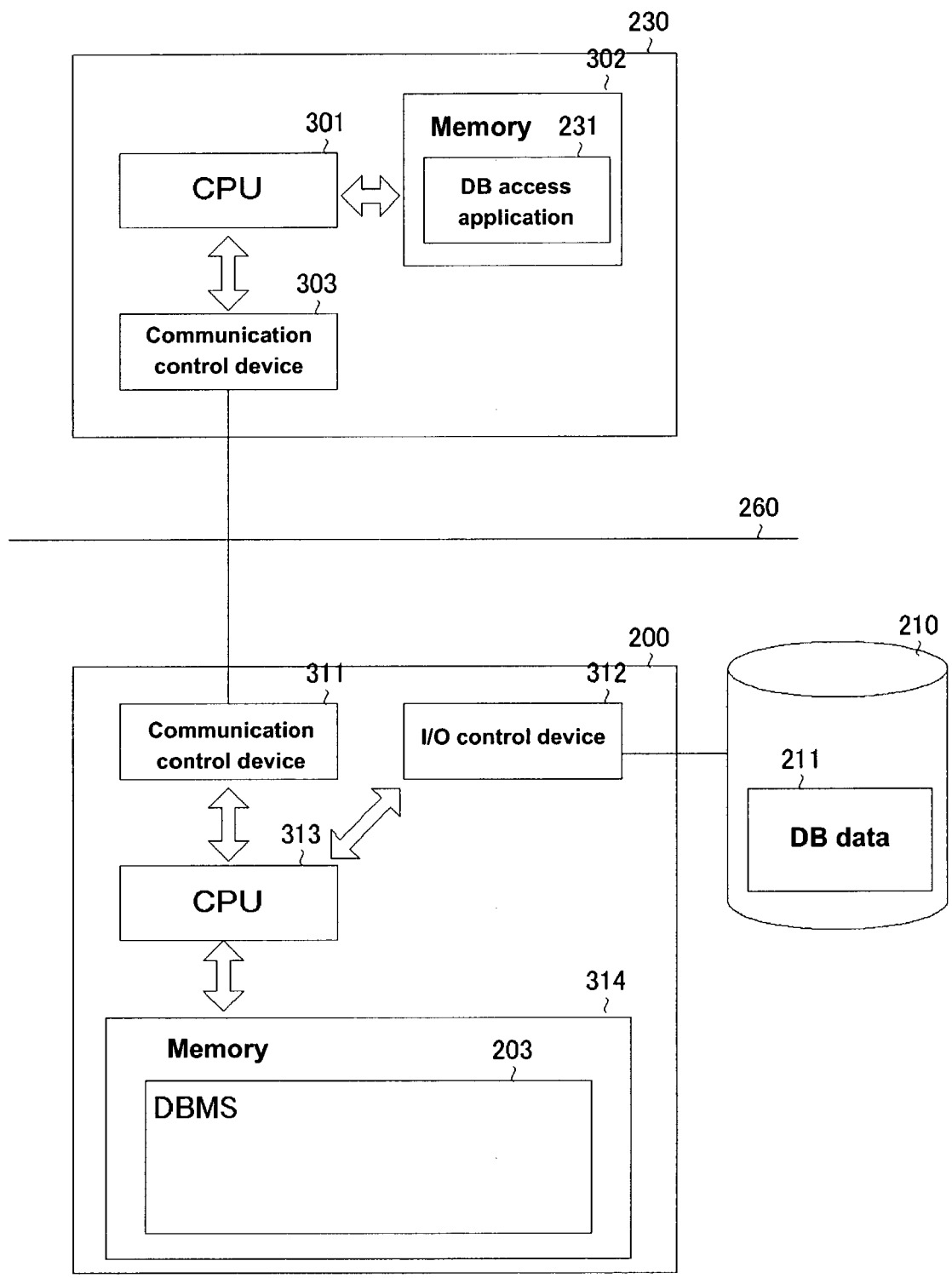
FIG. 3 schematically shows a hardware configuration of the system.

FIG. 3 shows an example of configurations of the information processors 200 and 230. Each of the information processors 200 includes a CPU 313, a memory 314, an I/O control device 312 and a communication control device 311. Processing of the DBMS 203 takes place when the CPU 313 executes the program of DBMS 203 stored in the memory 314. The I/O control device 312 performs reading and writing of data to and from the disk device 210; and the communication control device 311 sends and receives data with other information processors connected via the network 260.

Each of the information processors 230 executes the DB access application 231 stored in a corresponding memory 302. When the DB access application 231 executes an inquiry to the DBMS 203, the request is sent from a communication control device 303 of the information processor 230 to the communication control device 311 of the information processor 200 and the inquiry is sent to the DBMS 203. The DBMS 203 executes a process corresponding to the request, and if access to the DB data 211 is required, an access is made by the I/O control device 312 to the DB data 211 stored in the disk device 210. The processing result is transferred from the communication control device 311 to the communication control device 303 of the information processor 230 and sent to the request source, which is the DB access application 231.

Figure 4:
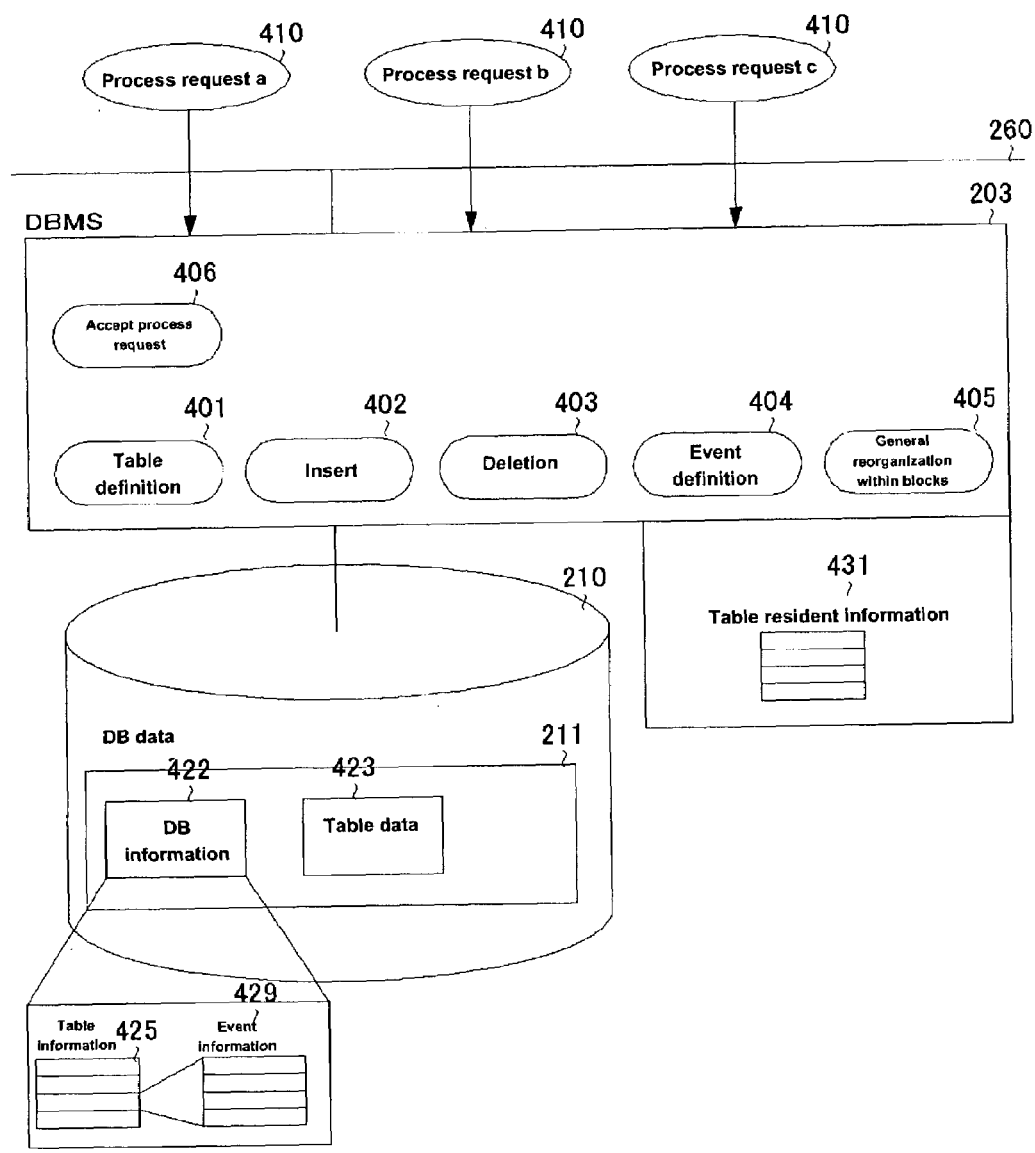
FIG. 4 schematically shows a configuration of a database management system (DBMS).

FIG. 4 shows the configuration of the DBMS 203. When the DBMS 203 through its process request reception 406 accepts a process request (a–c) 410, it analyzes the request and performs one of the operations that include a table definition 401, an insertion 402, a deletion 403, an event definition 404, and a general reorganization within blocks 405. Information that is referred to or updated when any of these operations takes place, as well as table-resident information 431, is stored in the memory.

The DB data 211 stores DB information 422 and table data 423. Table information 425 is stored as the DB information 422.

In the table information 425, information is added when tables are defined, at which point table names and composition column information are set. The table information 425 includes event information 429, which stores event information designated when tables or events are defined.

Data for each of the tables created is stored in the table data 423. Row data is stored through the insert operation 402, and column data is deleted through the delete operation 403.

The DBMS 203 may simultaneously accept a plurality of process requests (a–c) 410 and parallel-execute processes corresponding to the various requests.

Figure 5:
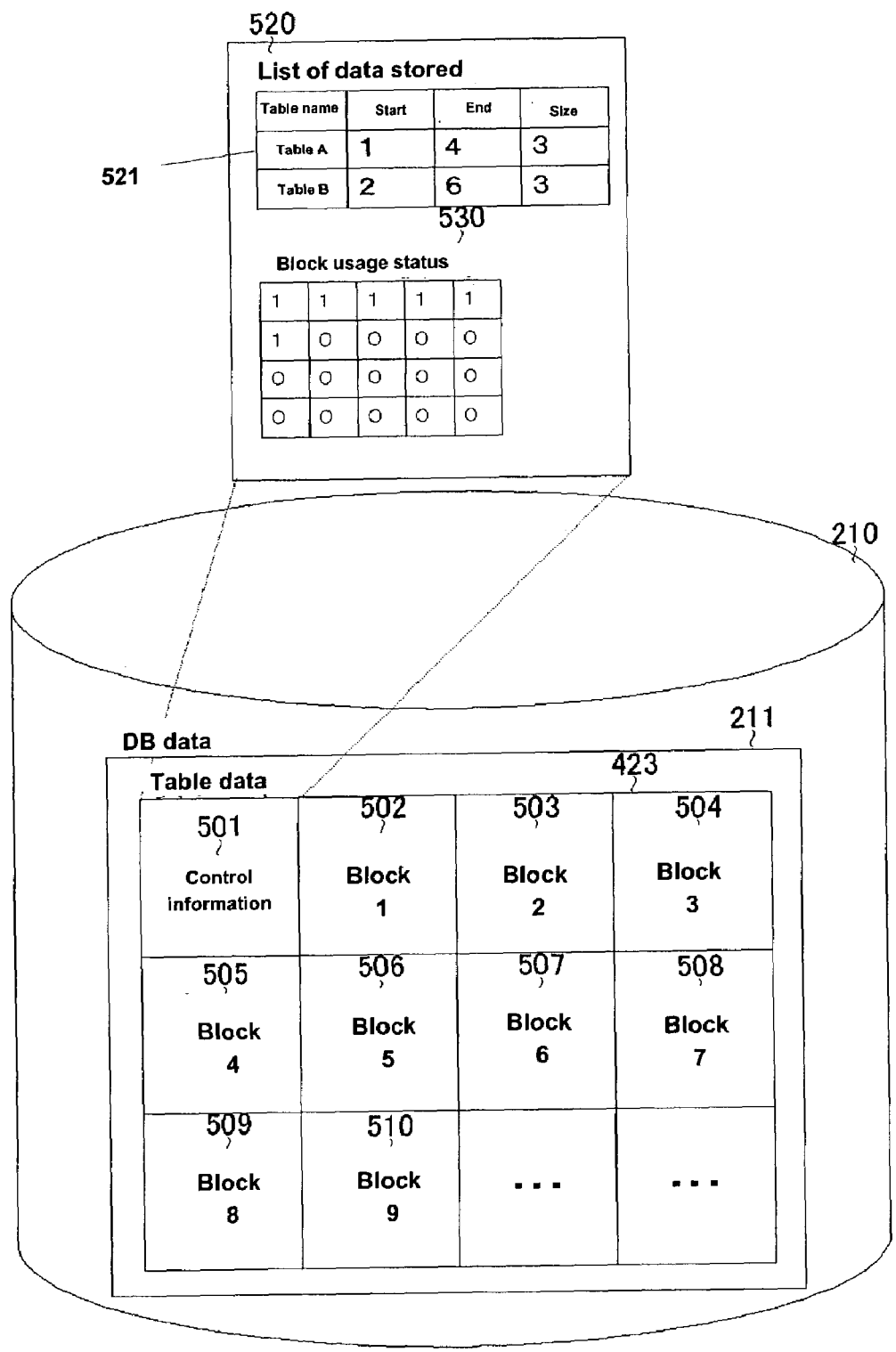
FIG. 5 schematically shows an internal structure of DB data.

As shown in FIG. 5, a storage area of the memory 210 is divided into smaller areas in constant units, the individual areas thus divided are called blocks. The table data 423 within the DB data 211 is a collection of control information 501, which manages a list of data stored 520 and a block usage status 530, and a plurality of blocks 502–510 for DB storage. When storing data, an area for storing the data is allocated in units of blocks. A plurality of data may be stored within each block. When data can no longer be added to one block, the next block is obtained to store the data.

Based on the list of data stored 520 contained in the control information 501 of the table data 423, table data A 521, for example, is stored in block numbers 1 through 4, where each block between the beginning block and ending block is chained to the next block by information that indicates the next block position. The block usage status 530 manages each block using bitmap information. The first bit corresponds to the first block, the second bit corresponds to the second block, the third bit corresponds to the third block, and so on. The usage status of blocks in FIG. 5 indicates that blocks 1, 2, 3, 4, 5 and 6 are in use, while other blocks are unused.

Figure 6:
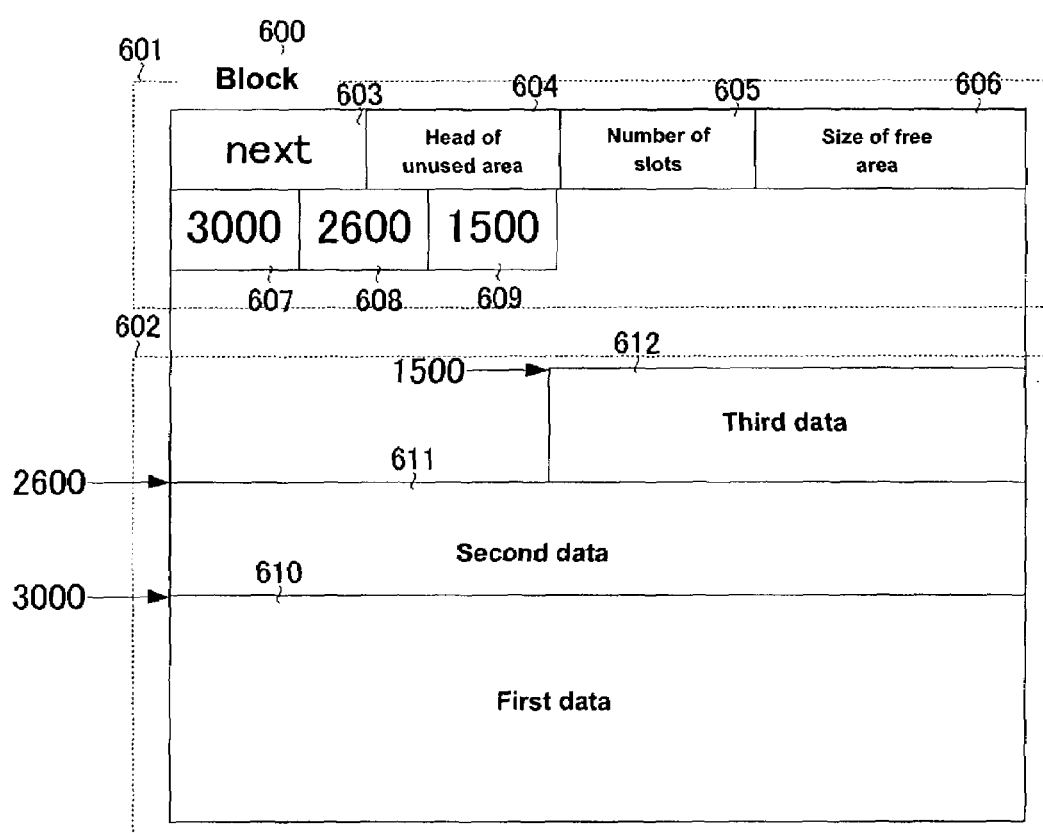
FIG. 6 shows a structure of a block.

Data stored in blocks is arranged in a slot form as shown in FIG. 6. The interior of a block 600 is divided into a control information section 601 and a data storage section 602; the control information section 601 stores chain information with the next block 603, beginning information for the unused area within the block 604, a number of slots 605 and a free area size within the block 606. The number of slots 605 represents the number of data stored in the corresponding block 600, where slots equivalent to the number of data exist and data positions are stored in each slot. In FIG. 6, there are three slots (607, 608 and 609), and data 610 indicated by the first slot 607 is stored in a data position 3000 and beyond. Since data is packed from the end, the beginning information for the unused area 604 is currently at a data position 1500, so that an area for the next data size is allocated beginning with the data position 1500 to store the next data.

Figure 7:
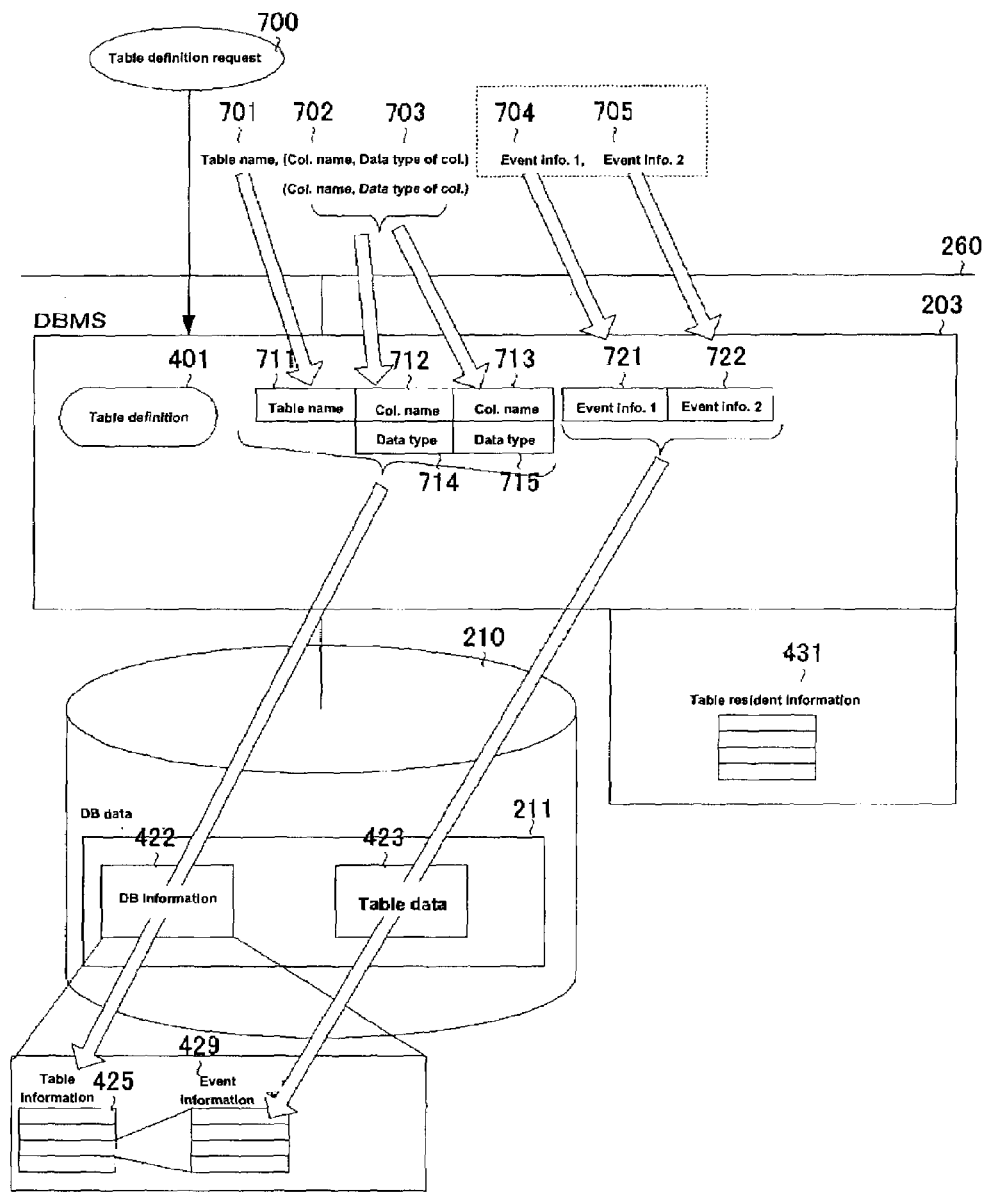
FIG. 7 shows a table definition request.

Referring to drawings beginning with FIG. 7, we will describe various DBMS processes by function concerning the method to allocate areas for storing data in tables of the database system in accordance with an embodiment of the present invention. Among functions in the method to allocate areas for storage are table definition, insertion, deletion, event definition and general reorganization within blocks. When a process request is made to the DBMS, a process of an operation function corresponding to the process request is executed.

First, in a table definition process as shown in FIG. 7, a process request 700 is sent to the DBMS 203 with a table name 701, which is the name of the table to be created, column names 702, which are columns that comprise the table, and a column data type 703. Event information 1 (704) and event information 2 (705) may or may not be designated. The DBMS 203 analyzes the request, executes the table definition operation 401, and adds a table name 711, column names 712 and 713, and column data types 714 and 715 to the table information 425 inside the DB information 422. If the event information 1 and 2 are designated, event information 1 (721) and event information 2 (722) are registered in the table information 425 as event information 429.

The event information 1 (721) may be an event to switch from a process to allocate an area for storage in a memory to a process to search for free areas resulting from data deletions, when the size of an area allocated in the memory reaches a designated value. The event information 2 (722) may be an event to switch from a process to search for free areas in the memory resulting from data deletions to a process to allocate an area for storage in the memory. Furthermore, events that may be designated include an event to stop the search process either when no free area is found in a search starting from an area searched on the preceding occasion to the last area within the area already reserved, or when no free area is found in a search starting from an area searched on the preceding occasion to the last area within the area already reserved, followed by a search starting from the beginning of the area already reserved to the area searched on the preceding occasion.

Figure 9:
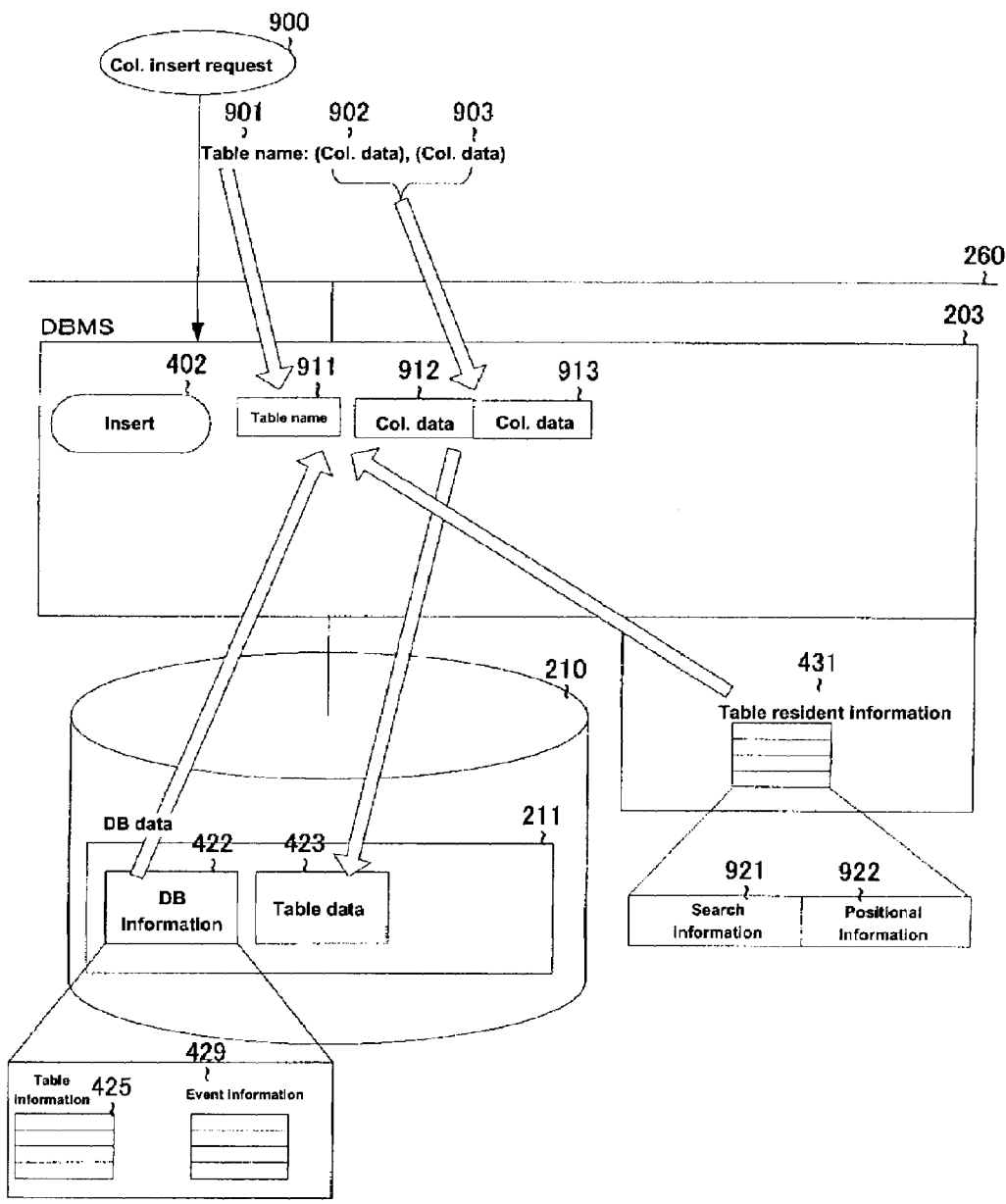
FIG. 9 shows a column insert request.
Figure 10:
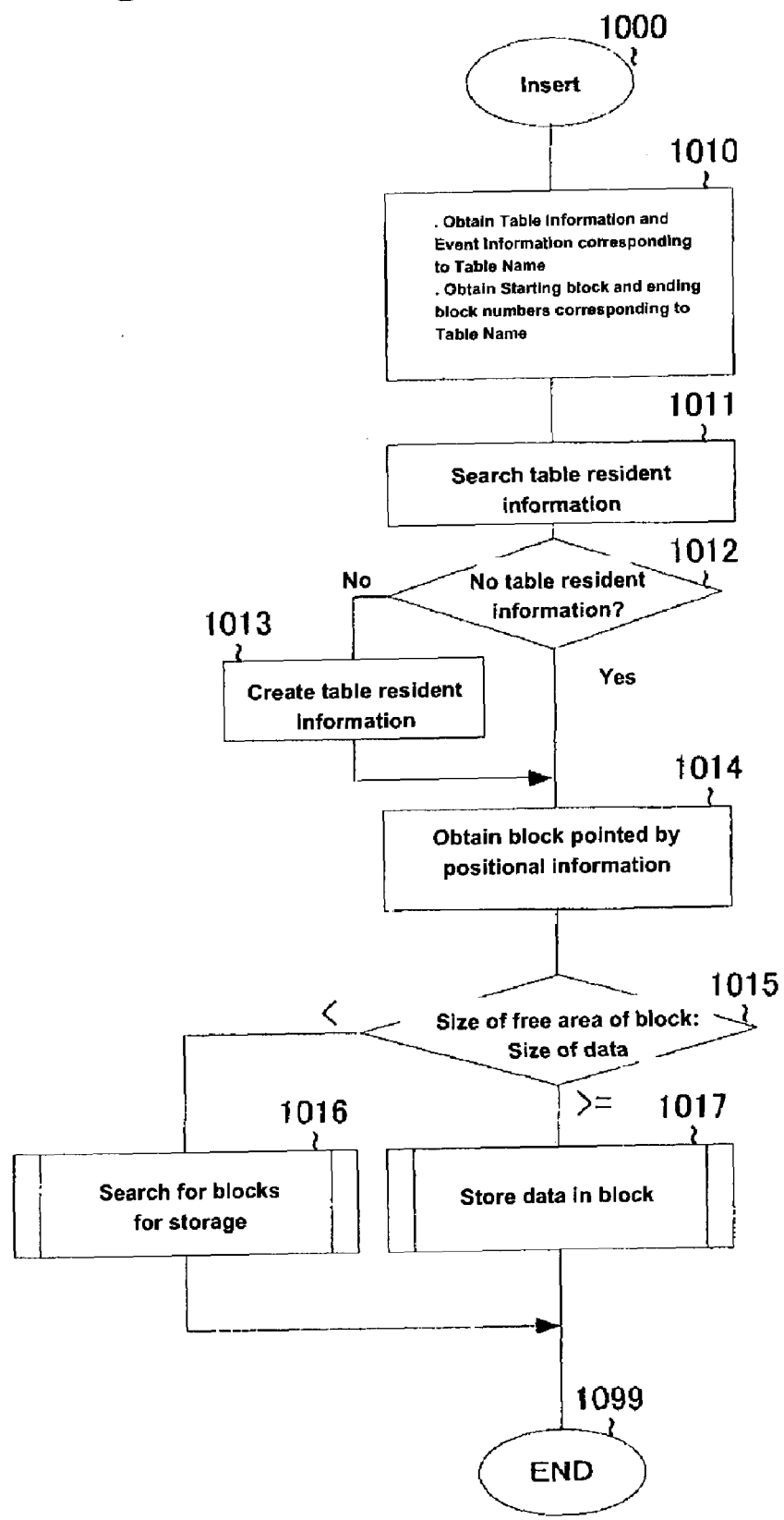
FIG. 10: An insertion process flow.

Next, referring to FIG. 9 and flowcharts in FIGS. 10–13, the data insertion process will be described. A column insert request 900 is sent to the DBMS 203 with a table name 901 of the table in which data is to be inserted and column data 902 and 903 to be inserted into various columns. There are an integer type and a character type in column data types, and data corresponding to each type is designated as data to be inserted. The DBMS 203 analyzes the request and executes the insert operation 402. FIG. 10 shows the flow of the insertion process. First, the table information 425 and the event information 429 corresponding to the table name 911 are obtained from the DB information 422; the table data 423 is referred to; and the beginning block number and the ending block number that are information concerning the corresponding table name are obtained from the list of stored date 520 described in FIG. 5 (1010).

Next, the table-resident information 431 that corresponds to the table is searched for (1011); if the corresponding table-resident information 431 is not found, one is created (1012 to 1013). The table-resident information 431 stores search information 921, which indicates the method currently being used to search for data storage areas for the table, and positional information 922, which indicates the position of the preceding search. When the table-resident information 431 is newly created, a process to define an area for storage in memory is executed, and the ending block number of the corresponding table data is set as the positional information 922 of the preceding search.

After detecting or newly creating the table-resident information 431, a block 600 indicated by the positional information 922 is obtained (1014), the free area size 606 of the block and the data size to be stored are compared (1015), if the free area size 606 is equal to or larger than the data size to be stored (1015 to 1017) the data is stored in the block (1017).

In the process 1017 to store data into the block, as shown in the flow in FIG. 11 (a), whether there are any contiguous free areas in which the data can be stored is checked from the beginning of the unused area (1111); if there are contiguous free areas (1111 to 1113), the number of slots are counted up, data is copied to the free areas in the block, data that is stored beginning with the corresponding slot is pointed to, the head position of unused area is updated, and the data size stored is subtracted from the free area size (1113).

If there are no contiguous free areas (1111 to 1112) in which the data can be stored, this indicates that areas corresponding to the free area size 606 are not contiguous in the block that includes free areas resulting from deletions. In such a case, since data cannot be stored in such a state, a reorganization within the block is executed (1112). The reorganization within the block involves moving out all valid data within the block, initializing the block, and re-storing the data.

If the data size to be stored is larger than the free area size of the block (1015 to 1016), blocks to be used for storage are searched for (1016).

Figure 12:
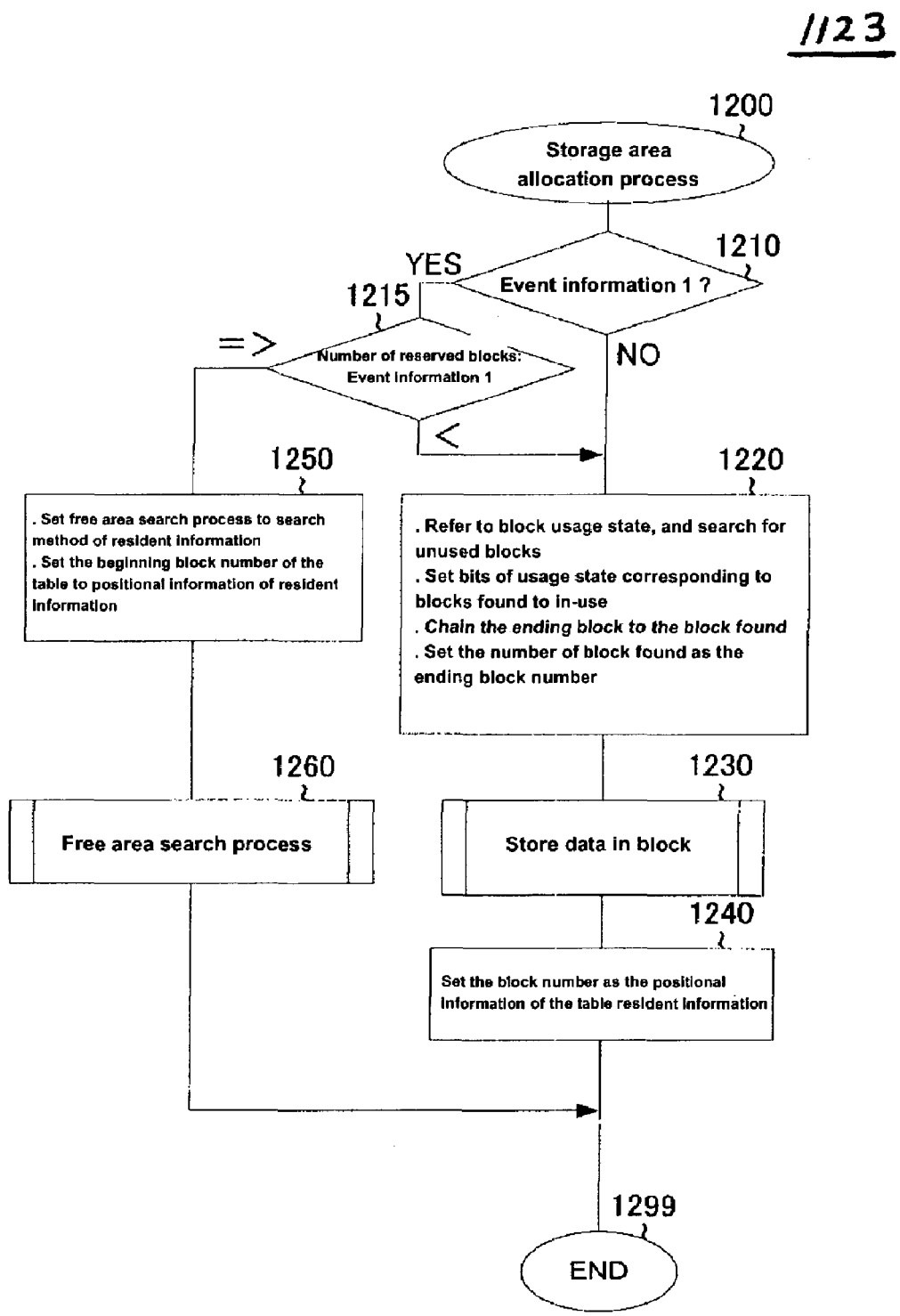
FIG. 12 shows a flowchart of a process to define a storage area.

As shown in the flow in FIG. 11(b), the search for storage block 1016 involves referring to the search information 921 of the table-resident information 431 (1121). If the search method indicated by the search information 921 is ① to allocate a storage area in the memory (1121 to 1123), a process to allocate a storage area is executed (1123). As the flow in FIG. 12 shows, the process to allocate a storage area involves checking that the event information 1 is registered (1210); if it is registered (1210 to 1215), whether the number of blocks reserved has reached the number designated by the event information 1 is checked (1215).

If the event information 1 is not registered (1210 to 1220), or if the number of blocks reserved has not reached the number designated by the event information 1 (1215 to 1220), the usage status 530 of the block is referred to in order to look for an unused block, the bit for usage status corresponding to the block found is set to in-use, the block corresponding to the ending block number in the table data is chained to the block found, the block number of the block found is set as the ending block number (1220); the data is stored in the block (the storage process is the same as described earlier) (1230); and the block number of the block found is set as the positional information 922 of the table-resident information 431 (1240).

If the number of blocks reserved has reached the number designated by the event information 1 (1215 to 1250), a search process to search for free areas resulting from data deletions is set as the search information 921 of the table-resident information 431, the beginning block number of the table is stored as the positional information 922 of the table-resident information 431 (1250), and a process to search for free areas resulting from data deletions is executed (1260).

Figure 13:
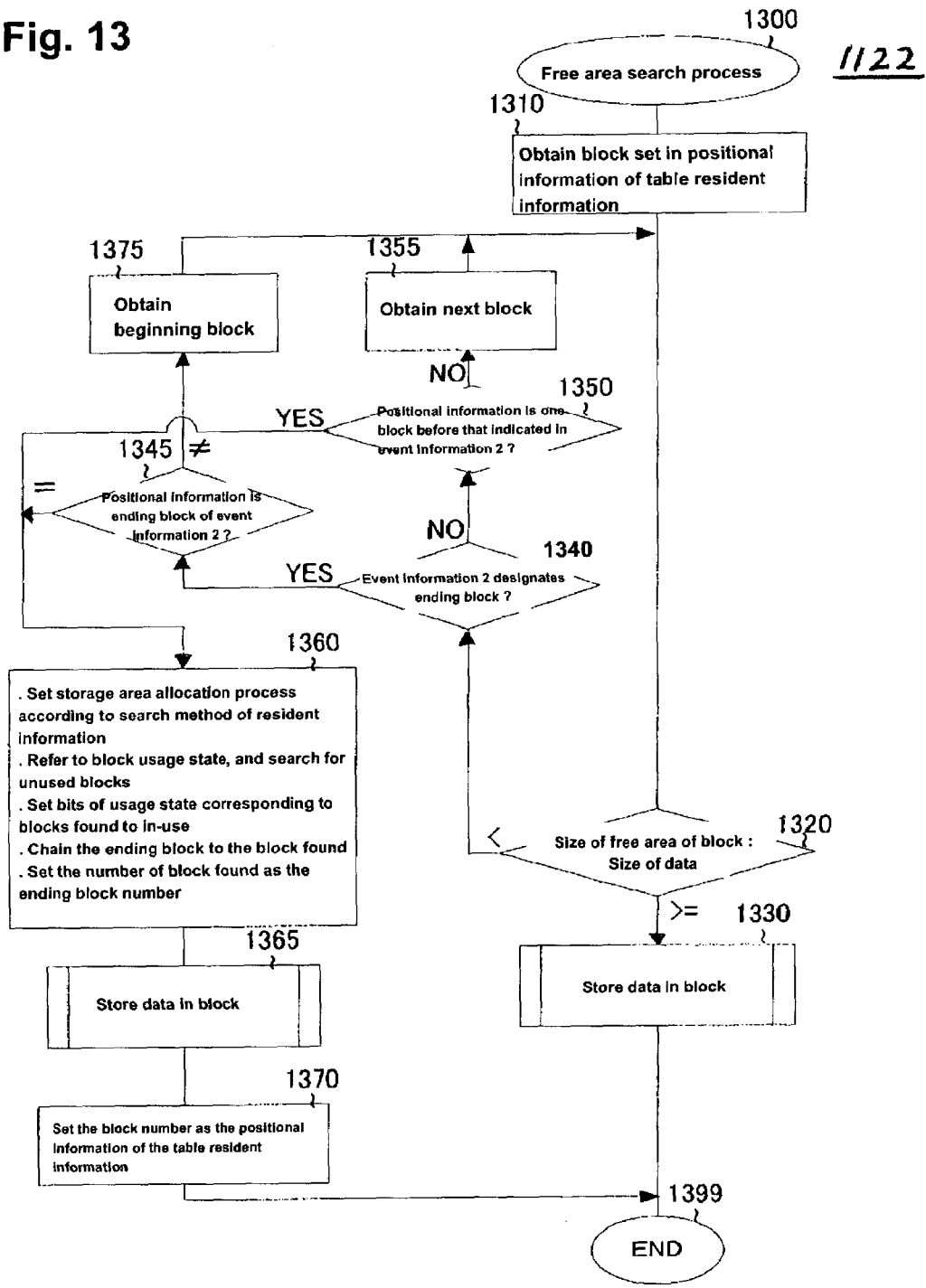
FIG. 13 shows a flowchart of a process to search for free areas.

As shown in the flow in FIG. 13, a process to search for free areas resulting from data deletions 1122 involves obtaining the block set in the positional information 922 of the table-resident information 431 (1310), comparing the block's free area size with the data size to be stored (1320), and if the free area size is equal to or larger than the data size (1320 to 1330), the data is stored in the block (1330). The process to store the data in the block is the process in FIG. 11(a).

If there are no free areas (1320 to 1340), whether the event information 2 is designated to end the search for free areas with the ending block is checked (1340); if the search does not end with the ending block (1340 to 1350), whether the current block position is one block before the block indicated by the event information 2 is checked (1350). If the current block position is not one block before the block indicated by the event information 2 (1350 to 1355), the next block is obtained (1355) and steps beginning with 1320 are repeated.

If the current block position is one block before the block indicated by the event information 2 (1350 to 1360), a process to define a storage area is set as the search information 921 of the table-resident information 431, the block usage status 530 is referred to in order to look for an unused block, the bit for usage status corresponding to the block found is set to in use, the block corresponding to the ending block number in the table data is chained to the block found, the block number of the block found is set as the ending block number (1360); the data is stored in the block (the storage process is the same as described earlier) (1365); and the block number of the block found is set as the positional information 922 of the table-resident information 431 (1370).

As a result of checking whether the event information 2 designates to end the search for free areas with the ending block (1340), if it is found that the search is designated to end with the ending block (1340 to 1345), whether the current block position is the ending block indicated by the event information 2 is checked (1345). If the current block position is not the ending block (1345 to 1375), the beginning block of the table is obtained (1375), and steps beginning with step 1320 are repeated.

If the current block position is the ending block indicated by the event information 2 (1345 to 1360), a process to allocate a storage area is set as the search information 921 of the table-resident information 431, the block usage status 530 is referred to in order to look for an unused block, the bit for usage status corresponding to the block found is set to in-use, the block corresponding to the ending block number in the table data is chained to the block found, the block number of the block found is set as the ending block number (1360); the data is stored in the block (the storage process is the same as described earlier) (1365); and the block number of the block found is set as the positional information 922 of the table-resident information 431 (1370).

Returning to the flow in FIG. 11(*b*) and to the search information 921 of the table-resident information 431 (1121), if the search method indicated by the search information 921 of the table-resident information 431 is ② to search for free areas resulting from data deletions (1121 to 1122), the process to search for free areas resulting from data deletions 1122 that was described earlier is executed.

If no storage areas can be allocated in the memory in the search for unused blocks in step 1220 of FIG. 12 or step 1360 of FIG. 13, the data insertion process is considered an error since there are no storage areas.

Figure 14:
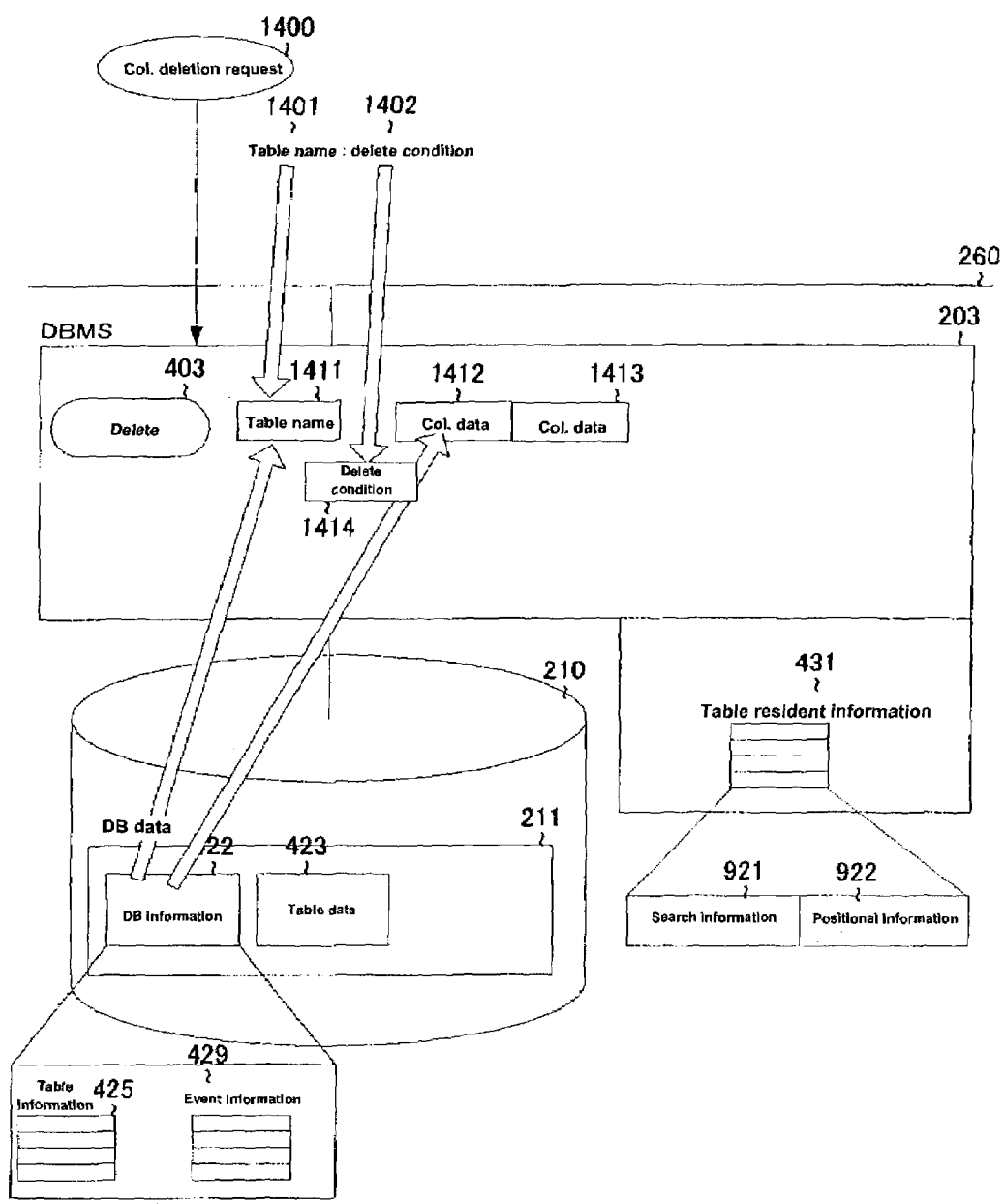
FIG. 14 shows a delete request.

In the data delete process, as shown in FIG. 14, a process request 1400 is sent to the DBMS 203 with a table name 1401 of the table to be deleted and delete conditions 1402. The DBMS 203 analyzes the request and executes the delete operation 403.

Based on the list of data stored 520 of the table data 423 in FIG. 5, data stored in sequence in blocks from the beginning block to the ending block that correspond to a table name 1411, which is designated to be deleted, is referred to; if any data that matches delete conditions 1414 is found, the value of the slot that points to the data is set at zero and the data size to be deleted is added to the free area size.

Figure 16:
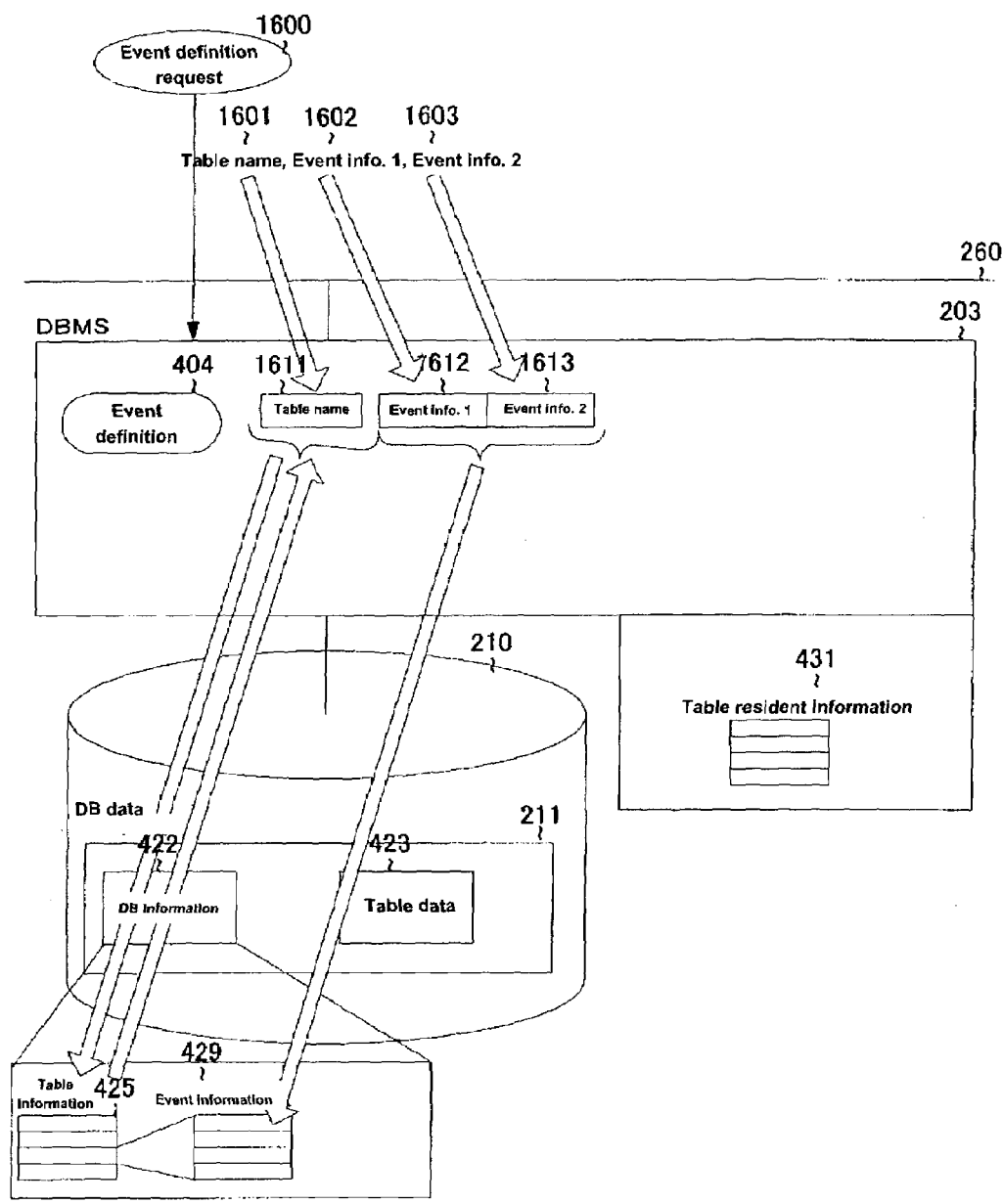
FIG. 16 shows a event definition request.

In the event definition process, as shown in FIG. 16, a event definition request 1600 is sent to the DBMS 203 with a table name 1601 of the table whose events are to be defined, as well as event information 1 (1602) and event information 2 (1603). The DBMS 203 analyzes the request, executes the event definition operation 404, and registers event information 1 (1612) and event information 2 (1613) as the event information 429 in the table information 425 within the DB information 422 that corresponds to a table name 1611. Even if the event information is already registered, the designated event information is re-registered.

Contents already described for the table definition process are designated as the event information 1 and the event information 2.

Figure 15:
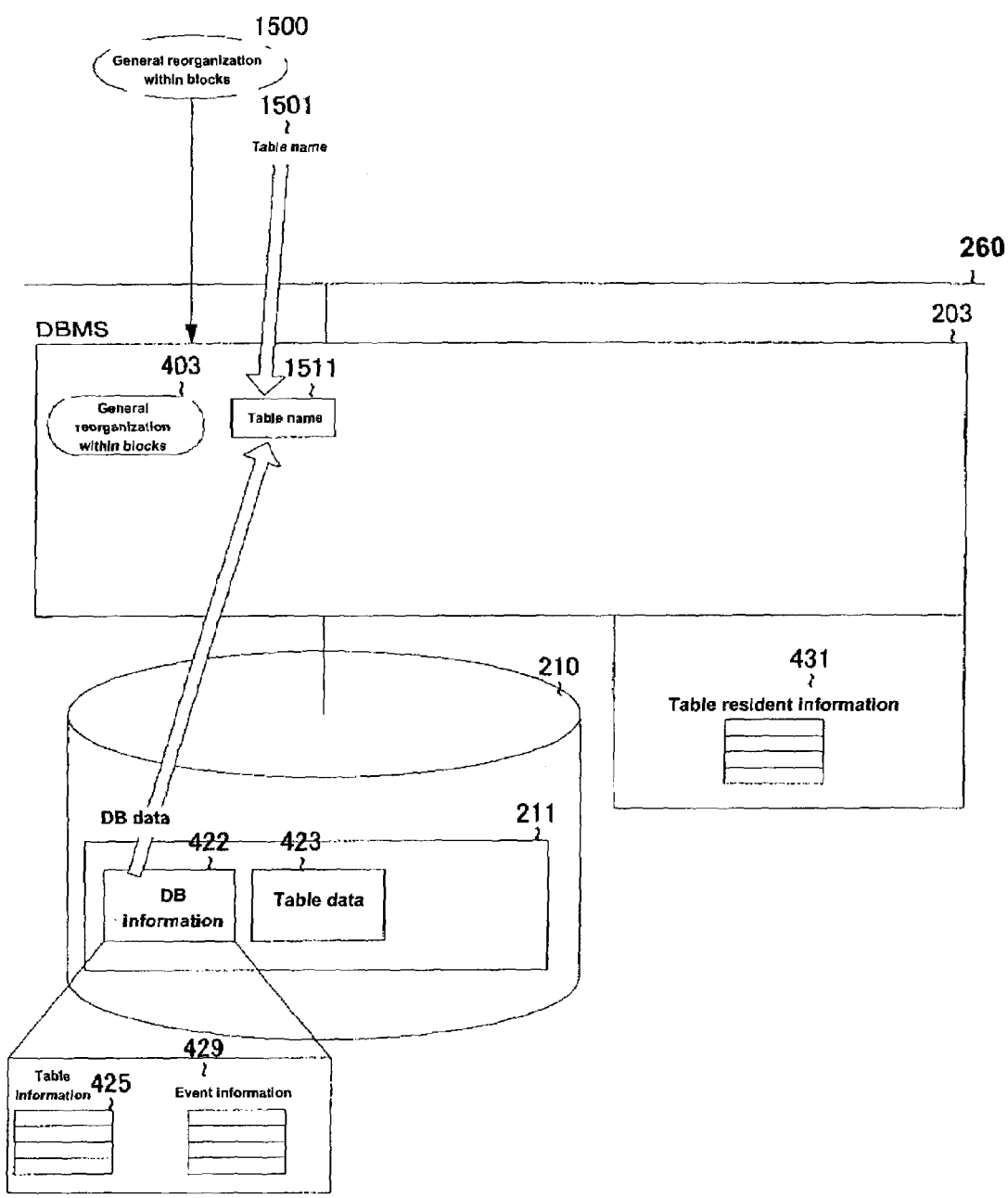
FIG. 15 shows a general reorganization process within blocks.

In the general reorganization within blocks process, as shown in FIG. 15, a general reorganization within blocks request 1500 is sent to the DBMS 203 with a table name 1501 of the table in which a general reorganization within blocks is to be performed. The DBMS 203 analyzes the request and executes the general reorganization within blocks operation 405.

In the general reorganization within blocks operation 405, blocks reserved for a designated table are referred to in sequence, a process similar to the reorganization within block process that was described above in the discussion on the insertion process is executed.

When free areas are created in numerous blocks due to deletions, the general reorganization process within pages may be executed in advance. By so doing, a reorganization within a block during each insertion process can be avoided, thereby restraining the performance deterioration of the insertion process.

Next, a specific example of the data management system in accordance with the present invention will be described.

The present invention is applied to a sales management, in which daily sales data is stored and one month's worth of data is deleted one year later in the order of oldest data. First, switching events 1 and 2 for processing to search for free areas are registered when tables or events are defined. Since data will be deleted one year later, the storage area to be reserved needs only be a size that can store one year's worth of data. A size that can store one year's worth of data is designated as the event information 1, while the event for the event information 2 is designated as when no free area is found in a search from the area searched on the preceding occasion to the last area within the area already reserved, followed by a search from the beginning of the area already reserved to the area searched on the preceding occasion.

As shown in table data 100 in FIG. 1(*a*) and table data 110 in FIG. 1(*b*), first, new blocks are allocated within the table data and data is inserted in sequence. Once data for one year is stored, blocks equivalent to a size designated by the event information 1 are reserved as shown in table data 120 in FIG. 1(*c*), and one month's worth of data from one year ago is deleted. When the block size becomes the size designated by the event information 1, the process switches to one that searches for free areas resulting from data deletions, and data is inserted into areas from which data was deleted. Since one month's worth of data is deleted at a time, data is inserted into areas from which data has been deleted, as shown in table data 130 in FIG. 1(*d*), table data 140 in FIG. 1(*e*) and table data 150 in FIG. 1(*f*). When the state represented by the table data 150 in FIG. 1(*f*) becomes the state represented by the table data 120 in FIG. 1(*c*), and when there are no more storage areas in the ending block, since the event information 2 is designated to take effect when no free area is found in a search from the area searched on the preceding occasion to the last area within the area already reserved, followed by a search from the beginning of the area already reserved to the area searched on the preceding occasion, a free area is searched for again from the beginning block. As described above, when the amount of data stored remains unchanged through repeated insertions and deletions, a storage area can be used with high storage efficiency by repeatedly reusing the same areas.

Figure 8A:
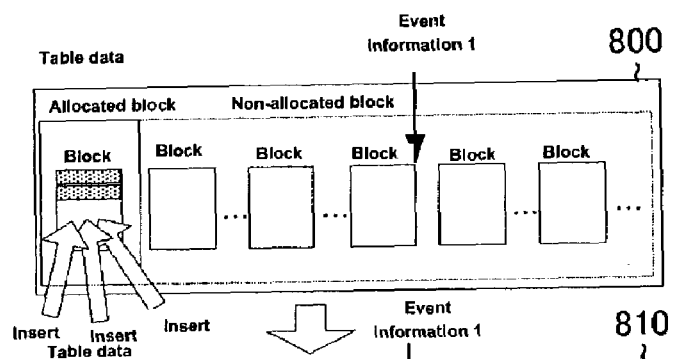
FIGS. 8(a)–8(e) show an example of an operation of repeatedly executing insertions and deletions when the amount of data gradually increases.
Figure 8B:
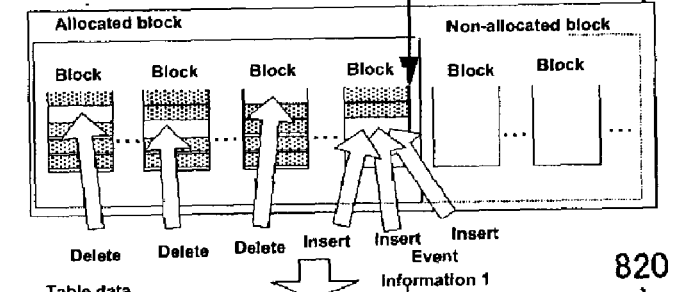
Figure 8C:
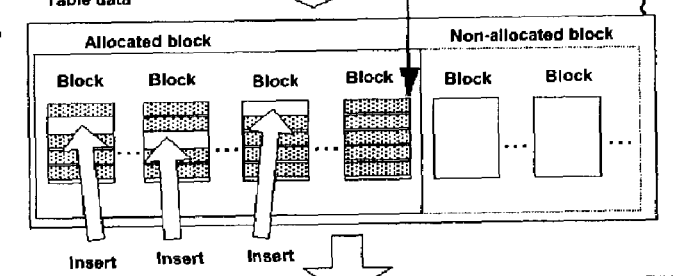
Figure 8D:
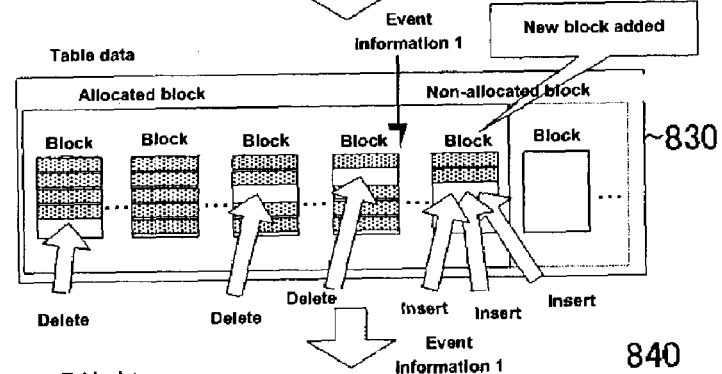
Figure 8E:
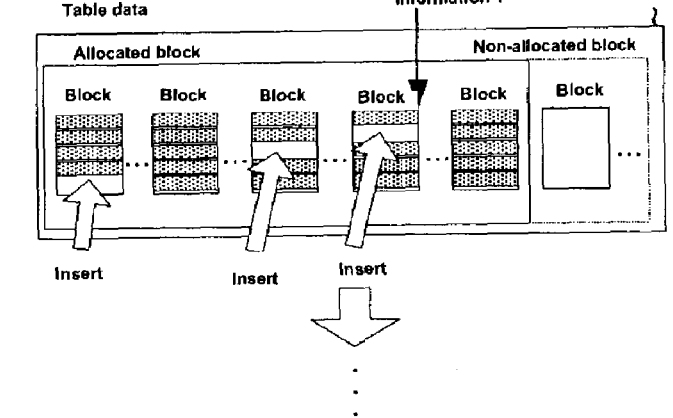

Alternatively, when the amount of data stored gradually increases through repeated insertions and deletions as shown in FIG. 8, new blocks are allocated within table data, data is inserted in sequence, and deletions are executed, as shown in table data 800 in FIG. 8(a) and table data 810 in FIG. 8(b). When blocks equivalent to a size designated by event information 1 is reserved, data is inserted into areas from which data has been deleted, as shown in table 820 in FIG. 8(c). When there are no more areas from which data has been deleted, a new block is added as shown in table data 830 in FIG. 8(d), and data is inserted into the new block. When the added block becomes full and no more data can be stored in it, data insertions into areas from which data has been deleted again are executed, as shown in table data 840 in FIG. 8(e); when there are no more areas from which data has been deleted, a new block is added as in the table data 830 in FIG. 8(d); and when the added block becomes full, data insertions into areas from which data has been deleted again are repeated as in the table data 840 in FIG. 8(e). Due to the fact that areas that become available through deletions are reused while new areas are also reserved, storage areas can be used with high storage efficiency.

On the other hand, when data is stored in a block until the block becomes full and the block is reused where data has been deleted, whether there are any contiguous free areas in which data can be stored is checked from the beginning of the unused area (1111) as shown in FIG. 11(a), and if there are no contiguous free areas in which the data can be stored, a reorganization within the block must be executed every time the block is reused. When a reorganization within a block is executed during an insertion process, the performance of the insertion process deteriorates. By executing a general reorganization within blocks before beginning to reuse the block where data has been deleted, deterioration in the performance of insertion process can be avoided, since executing the reorganization within a block during an insertion process can be avoided.

Based on the above description, deterioration of storage efficiency can be prevented and reorganizations can be either eliminated or their periods delayed, without suspending the database service to execute the reorganization process.

In the present embodiment, search methods are switched based on information designated in event information 1 and event information 2. However, the search methods can be switched forcibly through commands or the search methods can be switched when statistics of free areas is obtained through a general reorganization process within blocks and a certain amount of free area becomes available.

The internal structure of a database and the structure of a block shown in FIGS. 5 and 6 are examples of ways to realize a data storage management, and the present invention can be applied to management methods using other structures.

A program for executing the method to reserve pages (i.e. blocks) according to the present invention as described above may be stored on a recording medium readable with a computer, so that the program can be read onto the computer's memory and executed. Furthermore, the method to reserve pages according to the present invention can be realized with hardware such as electronic circuits.

According to the present invention, by having the user estimate the point at which a sufficient free area becomes available for reuse in utilizing an applicable table and register switching events, a process to insert data into added blocks is initially executed, and, at a time when sufficient free area becomes available, a process to insert data into areas from which data has been deleted is executed.

Due to the fact that free areas resulting from deletions can be reused without performing any extra process for insert or delete process other than checking the switching events, the deterioration of storage efficiency can be prevented without suspending the database service. As a result, the reorganization of storage areas can be eliminated, or the reorganization period delayed.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A page reserving method for a database system that accepts and analyzes an inquiry request, executes a required process and stores data in a memory, the page reserving processing method comprising the steps of:

designating at least one event to switch a data storage processing, upon executing data insertion when storing data, between a first process, in which data is stored in a new area that is allocated in a memory area of the memory, wherein when the allocated memory area is full, an additional area of memory is allocated;

and a second process, in which data is stored in a free area created by deleting data from a group of memory areas already allocated;

storing data through the first process upon inserting the data;

switching the data storage processing when the designated event occurs to thereby store the data in the second process, wherein the designated event is determined by an operator of the database system; and switching a process to search for a free area that has been created by deletion of data to a process to allocate an area for storage in the memory at a first event, and an unused area releasing process to release an unused area executed in parallel with the process to allocate an area for storage in the memory, wherein the first event is when the size of area allocated in the memory reaches a predetermined amount and when a predetermined area is released by the unused area releasing process, wherein the unused area releasing process to release the unused area is executed in parallel with the process to allocate an area for storage in the memory, and the first event is when a predetermined area is released by the unused area releasing process.

2. A page reserving method for a database according to claim 1, wherein the at least one event includes a first event at which a process to allocate an area for storage in the memory is switched to a process to search for a free area that has been created by deletion of data, and a second event at which the process to search for a free area that has been created by deletion of data is switched to the process to allocate an area for storage in the memory.

3. A page reserving method for a database according to claim 2, wherein the process to allocate an area for storage in the memory is switched to the process to search for a free area that has been created by deletion of data when the first event occurs.

4. A page reserving method for a database according to claim 2, wherein the process to search for a free area that has been created by deletion of data is switched to the process to allocate an area for storage in the memory when the second event occurs.

5. A page reserving method for a database according to claim 2, wherein the process to allocate an area for storage in the memory is switched to the process to search for a free area that has been created by deletion of data when the first event occurs, and the process to search for a free area that has been created by deletion of data is switched to the process to allocate an area for storage in the memory when the second event occurs.

6. A page reserving method for a database according to claim 2, wherein the process to search for a free area that has been created by deletion of data is executed when the first event occurs while the process to allocate an area for storage in the memory is being executed.

7. A page reserving method for a database according to claim 2, wherein the process to allocate an area for storage in the memory is executed when the second event occurs while the process to search for a free area that has been created by deletion of data is being executed.

8. A page reserving method for a database according to claim 2, wherein the process to search for a free area that has been created by deletion of data is executed when the first event occurs while the process to allocate an area for storage an the memory is being executed, and the process to allocate an area for storage in the memory is executed when the second event occurs while the process to search for a free area that has been created by deletion of data is being executed.

9. A page reserving method for a database according to claim 1, wherein the process to search for a free area that has been created by deletion of data includes the steps of memorizing a location of an area that has been searched for on a preceding occasion and conducting a succeeding search from the location memorized.

10. A page reserving method for a database according to claim 1, wherein the second event is an event when no free space is found in a search starting from an area that has been searched for on a preceding occasion to an ending area of reserved areas.

11. A page reserving method for a database according to claim 2, wherein the second event is an event when no free space is found in a search starting from an area that has been searched for on a preceding occasion to an ending area of reserved areas.

12. A page reserving method for a database according to claim 2, wherein the second event is an event when no free space is found in a search starting from an area that has been searched for on a preceding occasion to an ending area of reserved areas, followed by a search starting from the beginning of the reserved areas to the area that has been searched on the preceding occasion.

13. A page reserving method for a database according to claim 1, further comprising the step of switching a process to search for a free area that has been created by deletion of data to a process to allocate an area for storage in the memory, wherein the at least one event is an event when no free space is found in a search starting from an area that has been searched for on a preceding occasion to an ending area of reserved areas, and the process to search for a free area that has been created by deletion of data is switched to the process to allocate an area for storage in the memory when the event occurs.

14. A page reserving method for a database according to claim 1, further comprising the step of switching a process to search for a free area that has been created by deletion of data to a process to allocate an area for storage in the memory, wherein the at least one event is an event when no free space is found in a search starting from an area that has been searched for on a preceding occasion to an ending area of reserved areas, followed by a search starting from the beginning of the reserved areas to the area that has been searched on the preceding occasion, and the process to search for a free area that has been created by deletion of data is switched to the process to allocate an area for storage in the memory when the event occurs.

15. A page reserving method for a database according to claim 1, further comprising a reorganization process including the steps of: successively referring to the reserved areas in parallel with a process to store or delete data, and creating contiguous free areas within the reserved areas including free areas that have been created by deletion of data.

16. A page reserving method for a database according to claim 2, wherein the first event is when the size of area allocated in the memory reaches a predetermined amount.

17. A computer readable recording medium that stores a program for executing a page reserving method for a database system that accepts and analyses an inquiry request, executes a required process and stores data in a memory, the page reserving processing method comprising the steps of:

designating at least one event to switch a data storage processing, upon executing data insertion when storing data, between a first process, in which data is stored in a new area that is allocated in a memory area of the memory, wherein when the allocated memory area is full, an additional area of memory is allocated;

and a second process, in which data is stored in a free area created by deleting data from a group of memory areas already allocated;

storing data through the first process upon inserting the data;

switching the data storage processing when the designated event occurs to thereby store the data in the second process, wherein the designated event is determined by an operator of the database system; and switching a process to search for a free area that has been created by deletion of data to a process to allocate an area for storage in the memory at a first event, and an unused area releasing process to release an unused area executed in parallel with the process to allocate an area for storage in the memory, wherein the first event is when the size of area allocated in the memory reaches a predetermined amount and when a predetermined area is released by the unused area releasing process, wherein the unused area releasing process to release the unused area is executed in parallel with the process to allocate an area for storage in the memory, and the first event is when a predetermined area is released by the unused area releasing process.

18. A page reserving apparatus for a database system that accepts and analyzes an inquiry request, executes a required process and stores data in a memory, the page reserving processing apparatus comprising:

a first processing unit that stores data in a new area that is allocated in a memory area of the memory;

wherein when the allocated memory area is full, an additional area of memory is allocated;

a second processing unit that stores data in a free area created by deleting data from a group of memory areas already allocated; and a switching unit that switches based on a designated event, upon executing data insertion when storing data, between the first processing unit and the second processing unit to perform a data storage processing, wherein data is stored by the first processing unit upon initially inserting the data by the first processing unit, and the data storage processing is switched when the designated event occurs such that data is stored by the second processing unit, wherein the designated event is determined by an operator of the database system, wherein a process is switched to search for a free area that has been created by deletion of data to a process to allocate an area for storage in the memory at a first event, and an unused area releasing process to release an unused area executed in parallel with the process to allocate an area for storage in the memory, wherein the first event is when the size of area allocated in the memory reaches a predetermined amount and when a predetermined area is released by the unused area releasing process, wherein the unused area releasing process to release the unused area is executed in parallel with the process to allocate an area for storage in the memory, and the first event is when a predetermined area is released by the unused area releasing process.

* * * * *